United States Patent [19]

Zolkos et al.

[11] Patent Number: 5,780,827
[45] Date of Patent: Jul. 14, 1998

[54] LANDING CONTACT MECHANISM AND CARD LATCH FOR SMART CARD READER/WRITER

[75] Inventors: John Zolkos, Fremont, Calif.; Lance S. Nakamura, Pearl City, Hi.

[73] Assignee: Verifone, Inc., Santa Clara, Calif.

[21] Appl. No.: 729,366

[22] Filed: Oct. 16, 1996

[51] Int. Cl.$^6$ ............................................. G06K 7/06
[52] U.S. Cl. ........................ 235/441; 235/439; 235/486; 235/492
[58] Field of Search ............................ 235/492, 486, 235/485, 484, 483, 454, 435, 439, 441, 475, 479; 902/26

[56] References Cited

U.S. PATENT DOCUMENTS

| | | | |
|---|---|---|---|
| 4,404,464 | 9/1983 | Moreno | 235/438 |
| 4,443,049 | 4/1984 | DePommery et al. | 339/75 |
| 4,449,775 | 5/1984 | DePommery et al. | 339/75 |
| 4,527,052 | 7/1985 | Kilbourn | 235/485 |
| 4,602,351 | 7/1986 | Shimamura et al. | 235/441 X |
| 4,724,310 | 2/1988 | Shimamura et al. | 235/483 |
| 4,734,567 | 3/1988 | Hansbauer | 235/482 |
| 4,743,746 | 5/1988 | Murschall et al. | 235/441 X |
| 4,795,897 | 1/1989 | Chalendard | 235/482 |
| 4,843,221 | 6/1989 | Ohtsuki et al. | 235/441 |
| 4,864,114 | 9/1989 | Brianne et al. | 235/480 |
| 4,904,852 | 2/1990 | Mita et al. | 235/479 |
| 4,926,032 | 5/1990 | Shimamura et al. | 235/441 |
| 4,931,622 | 6/1990 | Ohtsuki et al. | 235/487 |
| 4,932,889 | 6/1990 | Bleier et al. | 439/260 |
| 4,940,418 | 7/1990 | Shimizu et al. | 439/260 |
| 4,976,630 | 12/1990 | Schuder et al. | 439/260 |
| 5,045,674 | 9/1991 | Mita et al. | 235/441 X |
| 5,091,618 | 2/1992 | Takahashi | 235/441 |
| 5,161,992 | 11/1992 | Birch | 439/260 |
| 5,196,687 | 3/1993 | Sugino et al. | 235/483 |
| 5,202,551 | 4/1993 | Parrer et al. | 235/486 |
| 5,243,176 | 9/1993 | Schoenhenz | 235/475 |
| 5,331,138 | 7/1994 | Saroya | 235/449 |
| 5,332,889 | 7/1994 | Lundstrom et al. | 235/380 |

FOREIGN PATENT DOCUMENTS 399-763  11/1990  European Pat. Off. .

*Primary Examiner*—Donald T. Hajec
*Assistant Examiner*—Michael G. Lee
*Attorney, Agent, or Firm*—Lowell C. Bergstedt

[57] ABSTRACT

A reader/writer apparatus for a contact-type smart card and having a frame forming a card slot for receiving a smart card and a landing contact mechanism carried on the frame for making electrical contact with contact pads on the smart card when inserted in the card slot. The landing contact mechanism includes a connector carriage carrying a card contact set thereon facing the card slot and mounted to the frame on a pivot axis defined thereon such that the connector carriage rotates generally in a plane parallel to the card slot. A drive post formed on the connector carriage contacts a leading edge of a smart card inserted in the card slot to rotate the connector carriage through a prearranged angle as the card moves to a predetermined read position within the card slot. Cooperative screw threads on the connector carriage and the frame move the connector carriage a predetermined distance into the card slot as it rotates through the prearranged angle to thereby bring the connector carriage to a read position with the card contact set in contact with contact pads on the smart card.

6 Claims, 9 Drawing Sheets

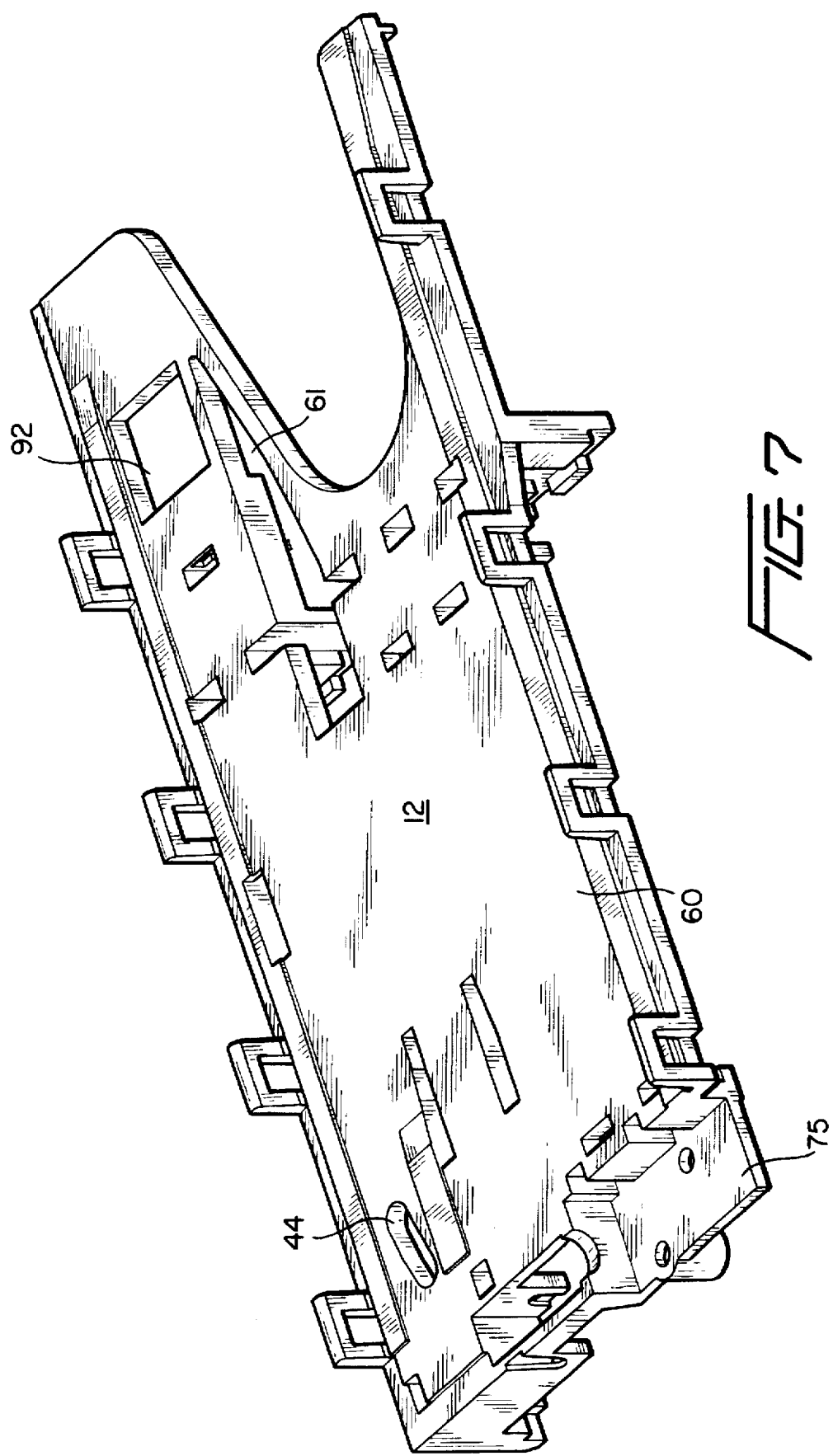

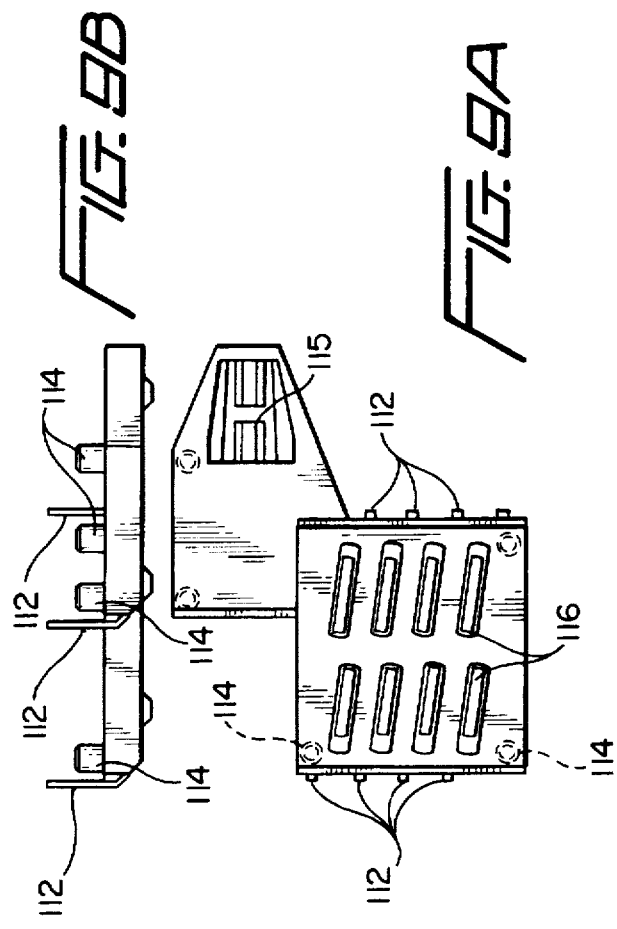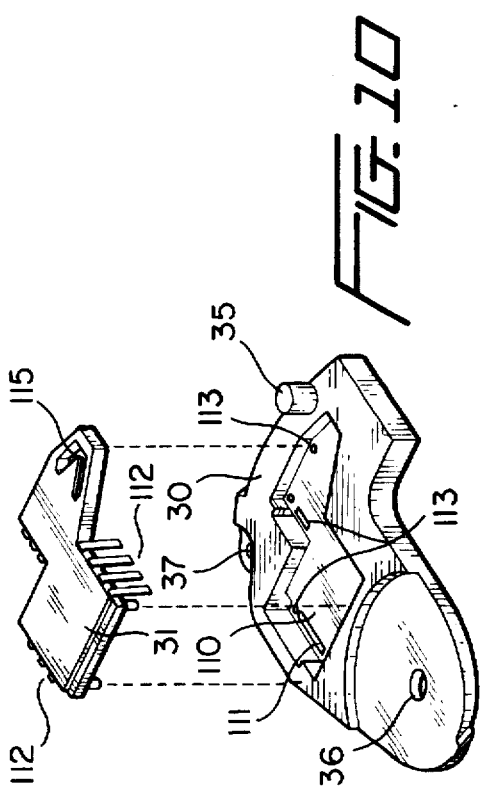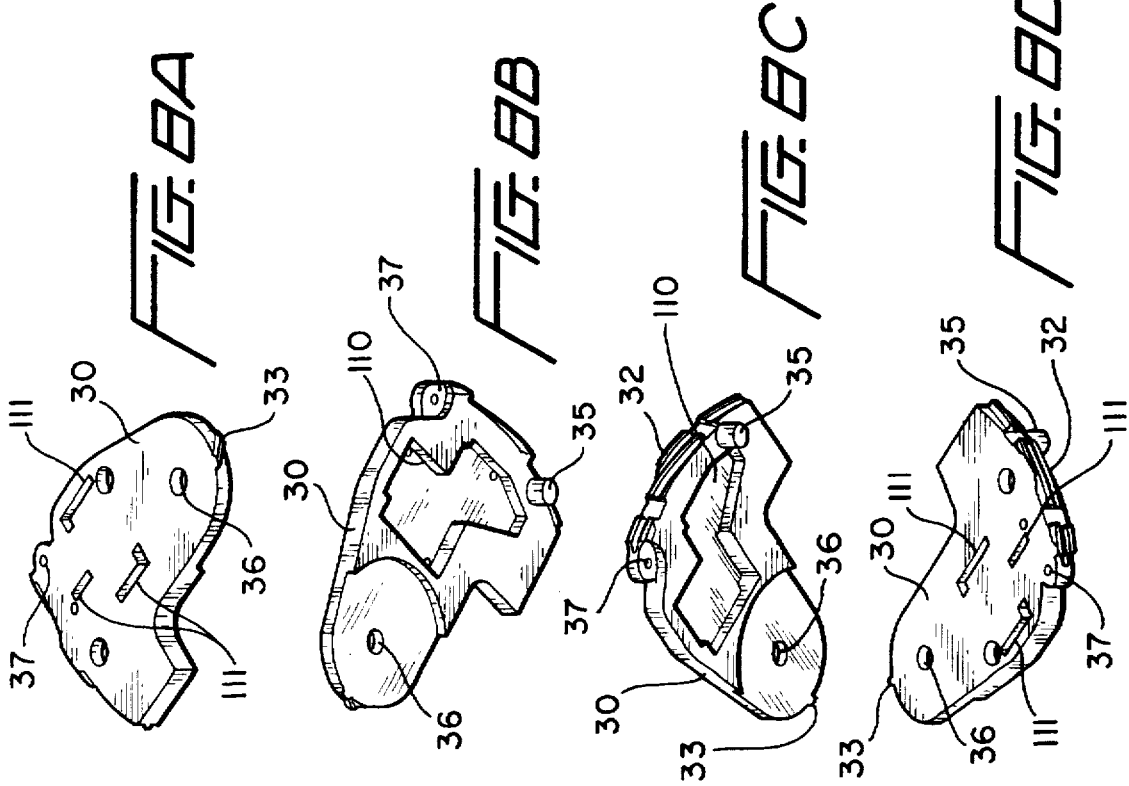

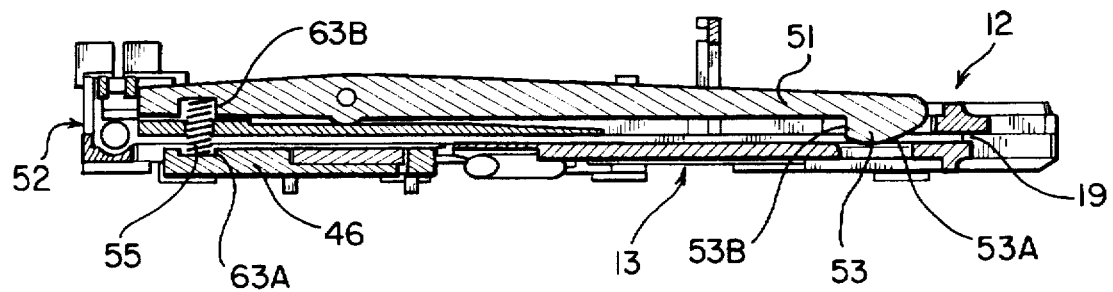
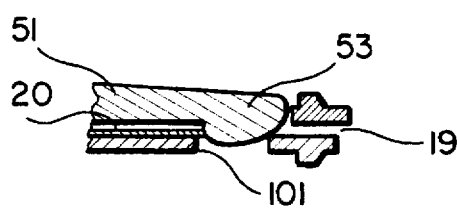
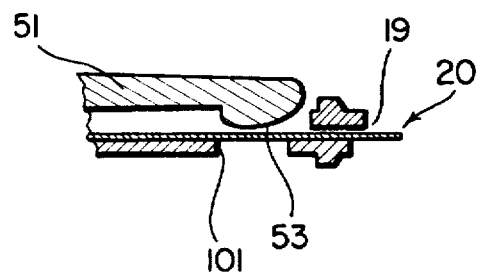
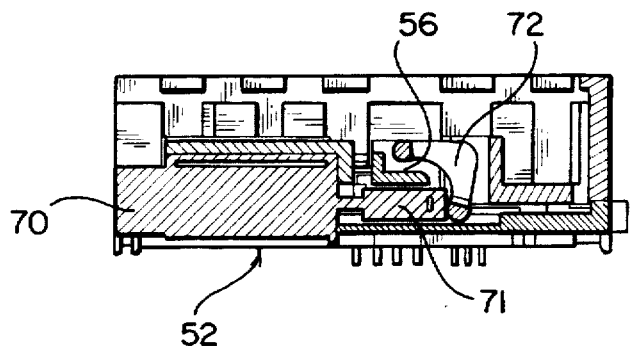
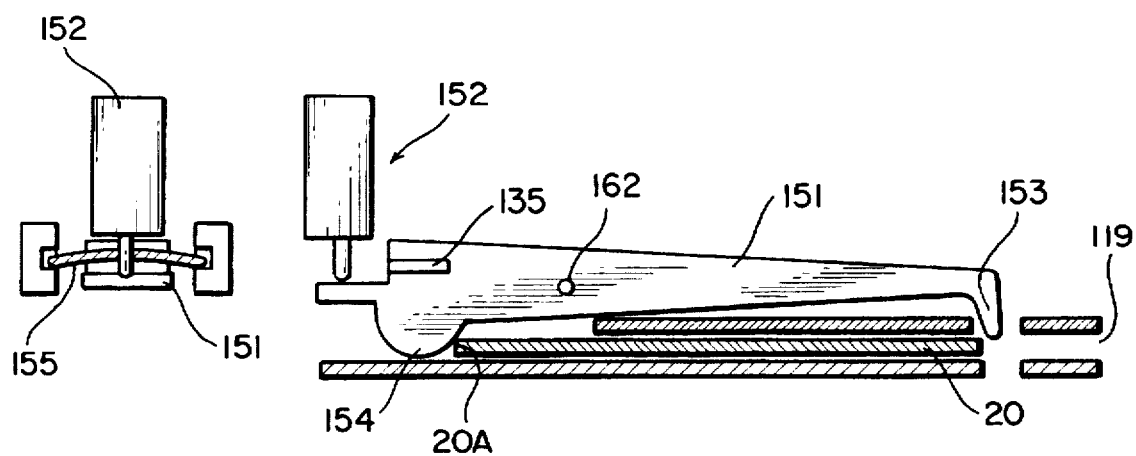

LANDING CONTACT MECHANISM AND CARD LATCH FOR SMART CARD READER/WRITER

FIELD OF THE INVENTION

This invention relates generally to smart card reader/writer systems and apparatus and more particularly to a landing contact mechanism for a smart card reader/writer system and to a card latch system for smart card reader/writer system.

BACKGROUND OF THE INVENTION

Smart card contact mechanisms generally comprise one of two types:

1. a sliding contact mechanism.

In this type of mechanism a set of spring-loaded contact members extending into the card slot contact the leading edge of the inserted smart card and slide along the surface of the card until the card reaches the read position with the contact members resting on the corresponding contact pads of the smart card. U.S. Pat. No. 4,675,516 illustrates this type of mechanism.

2. a landing contact mechanism.

In this type, spring-loaded contact members face the card slot, but are initially spaced away from the smart card as it is inserted, and some form of mechanism causes the contact members to move toward the smart card and particularly the contact pads of the smart card as it is further inserted into the card slot, and during the final phase of smart card insertion, brings the contact members of the reader/writer come contact with the contact pads with a combined landing and wiping action as the spring-loaded contact members compress.

While type 1 is a less expensive contact mechanism, it tends to be less reliable since it is wiping across a much longer surface of the smart card and thus more susceptible to picking up contaminants that could preclude making good electrical contact with the smart card contact pads. In addition, it results in more contact wear and more wear of the contact pads of the smart card. Thus, this type of contact mechanism is generally limited to smart card applications in which the smart card is only infrequently inserted and removed, e.g. in cellular telephone systems or transaction terminals applications in which the smart card performs a security function and generally remains mounted in the reader/writer device.

Type 2 is preferred in reader/writer device applications in which insertion and removal of a smart card is anticipated to occur dozens and, in some cases, hundreds of times per day, e.g. in electronic purse applications of ATMs and transaction terminals.

Prior art landing contact mechanisms tend to be complex mechanisms, and generally involve either a linear ramping movement or a pivoting movement to land the reader/writer contact set onto contact pads on the smart card as the smart card is inserted into a card slot. In some cases the card itself actuates the landing contact mechanism. In other cases, the card moves a carriage or frame which actuates the landing contact mechanism.

The following U.S. Patents are illustrative of prior art landing contact mechanisms in which the card or other portable device cause translation of a carriage or frame which, in turn operates the landing contact mechanism:

Selinki U.S. Pat. No. 3,917,372, issued Nov. 4, 1975
Moreno U.S. Pat. No. 4,404,464, issued Sep. 13, 1883
Simamura et al. U.S. Pat. No. 4,724,310, issued Feb. 9, 1988

The following U.S. Patents are illustrative of prior art landing contact mechanisms in which the leading edge of the inserted smart card directly operates the landing contact mechanism to cause the reader/writer contact set to land on the smart card contact pads:

Bertrand et al. U.S. Pat. No. 4,443,049, issued Apr. 17, 1984
Chalendard U.S. Pat. No. 4,795,897, issued Jan. 3, 1989
Bleier et al. U.S. Pat. No. 4,932,889, issued Jun. 12, 1990

Other types of prior art landing contact mechanisms are illustrated in the following patents:

Murschall U.S. Pat. No. 4,743,746, issued May 10, 1988, utilizes a pivoting card slot defining frame with a card contact pad window therein so that the frame and smart card a are both manually pivoted into contact with a stationary set of reader/writer contact fingers. In other words, the smart card contact pads land on the contact fingers of the reader/writer device which is the reverse of landing the reader/writer contact fingers on the contact pads of the smart card.

Ohtsuki et al U.S. Pat. Nos. 4,843,221 and 4,931,622, utilize a reader/writer contact set carried on a pivoting card latch arm so that the contact set pivots away from the smart card surface as the leading edge of the card raises the latch head of the latch arm and then pivots back into contact with the smart card contact pads when the latch head of the latch arm falls back behind the trailing edge of the smart card after full insertion.

It is known in the art to combine a landing contact mechanism with a card latch mechanism which retains the smart card in the read position after insertion to make sure that the card is not prematurely withdrawn by the cardholder during operation of the reader/writer system. The Ohtusuki et al. patents referred to above directly integrate the card latch mechanism with the reader/writer landing contact mechanism, but require a complex card ejecting mechanism to partially eject an inserted smart card after the card latch is released.

The Murschall Patent discussed above also has a card latching feature which utilizes a catch projection on the stationary frame near the card entry location so that the trailing edge of the smart card is pushed under this lip by a compression spring at the forward end of the card slot after card and frame are pivoted into the card read position and then released. This slight backward movement of the smart card under the lip is relied upon for contact wiping action.

Other card latching devices are illustrated in Kilborn U.S. Pat. No. 4,527,052 and Hansbauer U.S. Pat. No. 4,734,567 and Sugino et al. U.S. Pat. No. 5,196,687.

OBJECTS OF THE INVENTION

It is the principal object of this invention to provide an improved smart card reader/writer.

It is another object of this invention to provide an improved smart card reader/writer landing contact mechanism.

It is another object of this invention to provide an improved smart card reader/writer card latch mechanism.

It is another object of this invention to provide a smart card reader/writer including landing contact mechanism and card latch at low manufacturing cost

FEATURES AND ADVANTAGES OF THE INVENTION

One aspect of this invention features a reader/writer apparatus for a contact-type smart card and having a frame forming a card slot for receiving a smart card and a landing contact mechanism carried on the frame for making electrical contact with contact pads on the smart card when inserted in the card slot. The landing contact mechanism includes a connector carriage carrying a card contact set thereon facing the card slot; a mounting means mounts the connector carriage to the frame on a pivot axis defined thereon such that the connector carriage rotates generally in a plane parallel to the card slot. A drive means is formed on the connector carriage and arranged to contact a leading edge of a smart card inserted in the card slot to rotate the connector carriage through a prearranged angle as the card moves to a predetermined read position within the card slot. Cooperative screw thread means are formed on the connector carriage and the frame for moving the connector carriage a predetermined distance into the card slot as it rotates through the prearranged angle to thereby bring the connector carriage to a read position with the card contact set in contact with the smart card.

In a preferred embodiment, the drive means comprises a post formed on the connector carriage and extending into the card slot to contact a leading edge of a card inserted into the card slot such that the card directly drives the connector carriage from an initial position to the read position during a final insertion movement of the card to a read position within the card slot.

Furthermore, a spring means is coupled between the connector carriage and the frame for biasing the connector carriage toward an initial rest position and a latch means is mounted on the frame and operative when the card is inserted to the read position for latching the card in the read position, thereby latching the connector carriage in the read position. A latch release means is operative to release the latch means to permit the spring means to return the connector carriage from the read position to the initial rest position, whereby the drive means drives the inserted card partially out of the card slot.

In a preferred embodiment of this invention, the frame defines an open region in one wall thereof forming a portion of the card slot for admitting the connector carriage and connector block thereon into the card slot, the frame having a mounting flange and post formed on one side of the open region for defining the pivot axis of the connector carriage. The frame further has a screw thread means formed on interior edge portions of the open region. The connector carriage includes an aperture mounted over the post to pivot thereon and having screw thread means formed on side wall portions adjacent to and engaging with the screw thread means on the interior edge wall of the open region and together forming the cooperative screw thread means.

Also in this preferred embodiment, the frame further defines a recessed area adjacent to and communicating with the open region and having a first spring mount means at location removed from the open region and the carriage means has a second spring mount means formed thereon adjacent to the recessed area. The reader/writer apparatus further includes a tension spring means mounted between the first and second spring mount means to bias the connector carriage toward an initial position. A latch means is mounted on the frame and is operative when the card is inserted to the read position for latching the card in the read position and thereby latching the connector carriage in the read position. A latch release means operates to release the latch means to permit the tension spring means to return the connector carriage from the read position to the initial rest position, whereby the drive means drives the inserted card partially out of the card slot.

Preferably, the latch means comprises an elongated latch arm having a latch head element at one end thereof, and the frame defines a second open region in a card slot wall adjacent a card entry portion of the card slot for admitting the latch head element into the card slot. The frame and the elongated latch arm have cooperative mounting means for pivot mounting of the latch to the card slot wall such that the latch head element moves between a card admit position and a card latch position. A latch spring means is mounted between the frame and the latch arm biases the latch head element toward the card latch position. The latch head element having a sloped surface facing toward the card entry portion of the card slot permitting the leading edge of an inserted card to move the latch head element to the card admit position until the trailing edge of the card passes the latch head element as the card reaches the read position within the card slot, whereupon the latch spring means moves the latch head element to the card latch position, the latch head element has a card latch surface facing away from the card entry portion of the card slot to preclude manual withdrawal of a card inserted to the read position and to retain the card and the connector carriage in associated read positions.

Preferably, the latch release means comprises a lever for pivoting the latch arm from the card latch position to the card admit position and latch release drive means for operating the lever means in the form of a solenoid having a core operatively engaging the lever means to drive the lever means and thereby pivot the latch arm to the card admit position when the solenoid is electrically actuated. The tension spring means is operative after the latch release drive means and lever means drive operate to pivot the latch arm to the card admit position to move the connector carriage to the initial position and to drive the card partially out of the card slot. This enables the latch release drive means to be deactuated after a short time interval and the partially retracted card will maintain the latch arm in the card admit position until the card is manually retracted out of the card slot.

To provide a hybrid reader that can read magstripe cards as well as smart cards, a mag-stripe read head is mounted on the frame near the card entry portion of the card slot adjacent the latch head element with a reading face portion of the read head extending through an opening in the frame into the card slot and contacting a mag-stripe region of a card inserted into the card slot to read data thereon as the card is inserted.

The parts of a rotating landing contact mechanism and card latch mechanism having the features of a preferred embodiment of this invention can readily be implemented using standard plastic molding processes of the individual parts and easy hand assembly of the molded parts. This provides for a low cost smart card reader/writer landing contact mechanism and card latch.

BRIEF DESCRIPTION OF DRAWING FIGURES

FIG. 1A illustrates the features of a standard smart card and also illustrates a magstripe card or a hybrid card.

FIGS. 4, 5 and 5A depict features of an upper frame member forming a portion of a reader/writer apparatus in accordance with this invention.

FIGS. 6 and 7 depict features of a lower frame member forming a portion of a reader/writer apparatus in accordance with this invention.

FIGS. 8A–8D are miscellaneous views of a connector carriage mechanism useful in a preferred embodiment of a reader/writer apparatus in accordance with this invention.

FIGS. 9A and 9B illustrate features of a contact set mechanism useful in a connector carriage as shown in FIGS. 8A to 8D.

FIG. 10 illustrates the assembly of a contact set as shown in FIGS. 9A and 9B into a connector carriage as shown in FIGS. 8A–8D for use in a preferred embodiment of a reader/writer apparatus in accordance with this invention.

FIGS. 11–14 are section views illustrating features and operation of a preferred card latch mechanism in accordance with this invention.

FIGS. 15 and 16 are section views of an alternative embodiment of a card latch mechanism in accordance with this invention.

Figure 1:
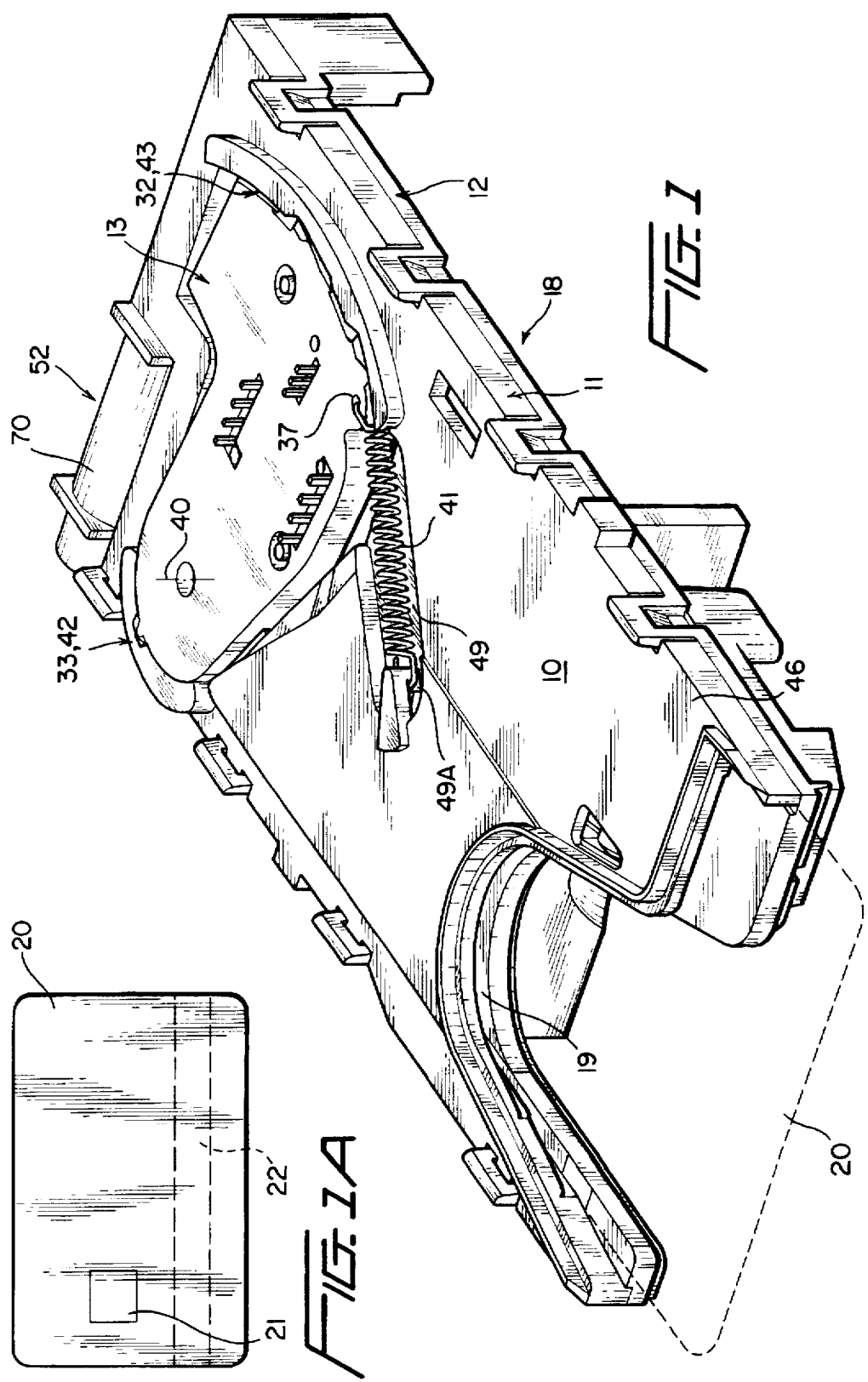
FIG. 1 is an top isometric view of a reader/writer apparatus in accordance with this invention.
Figure 2:
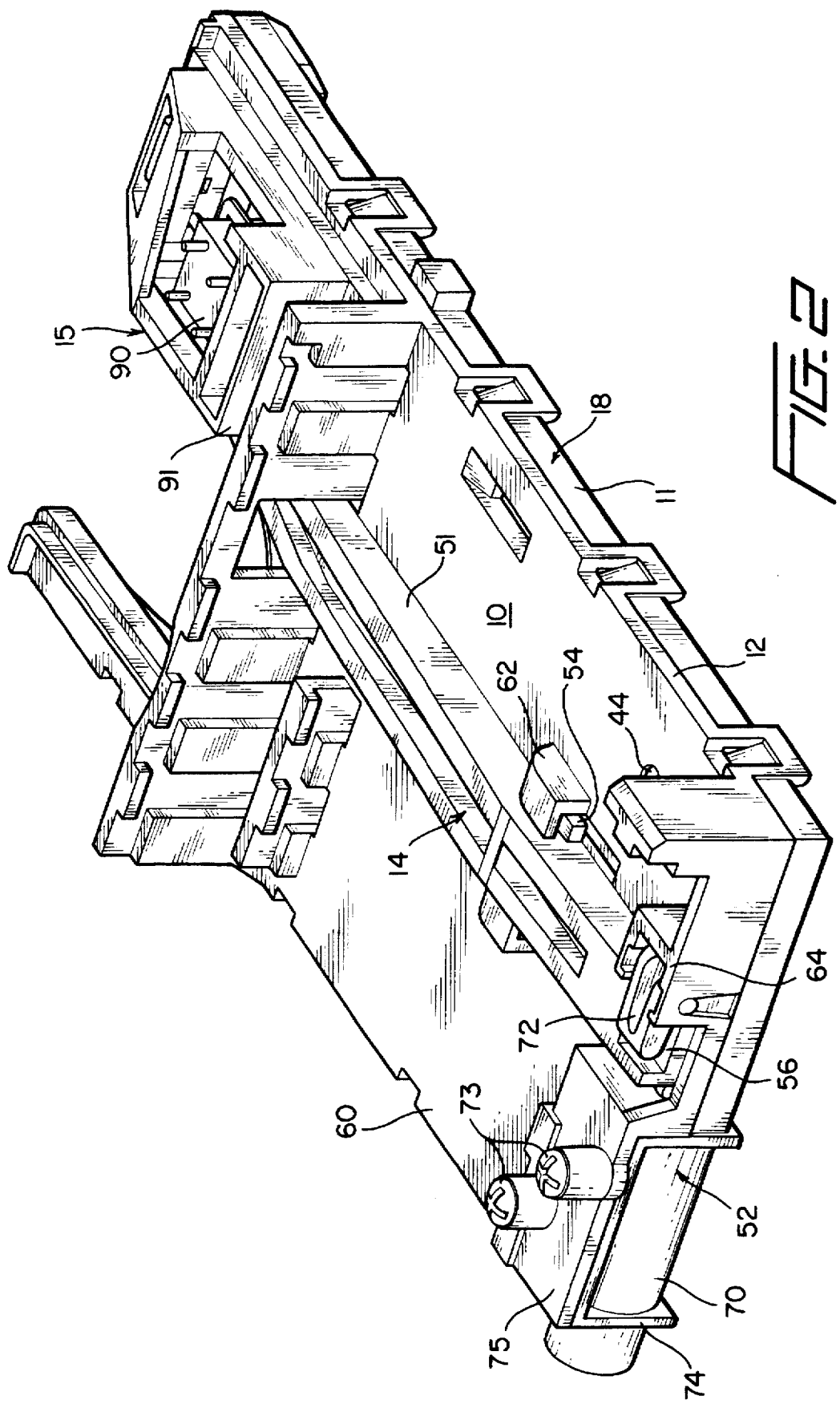
FIG. 2 is a bottom isometric view of a reader/writer apparatus in accordance with this invention.
Figure 3:
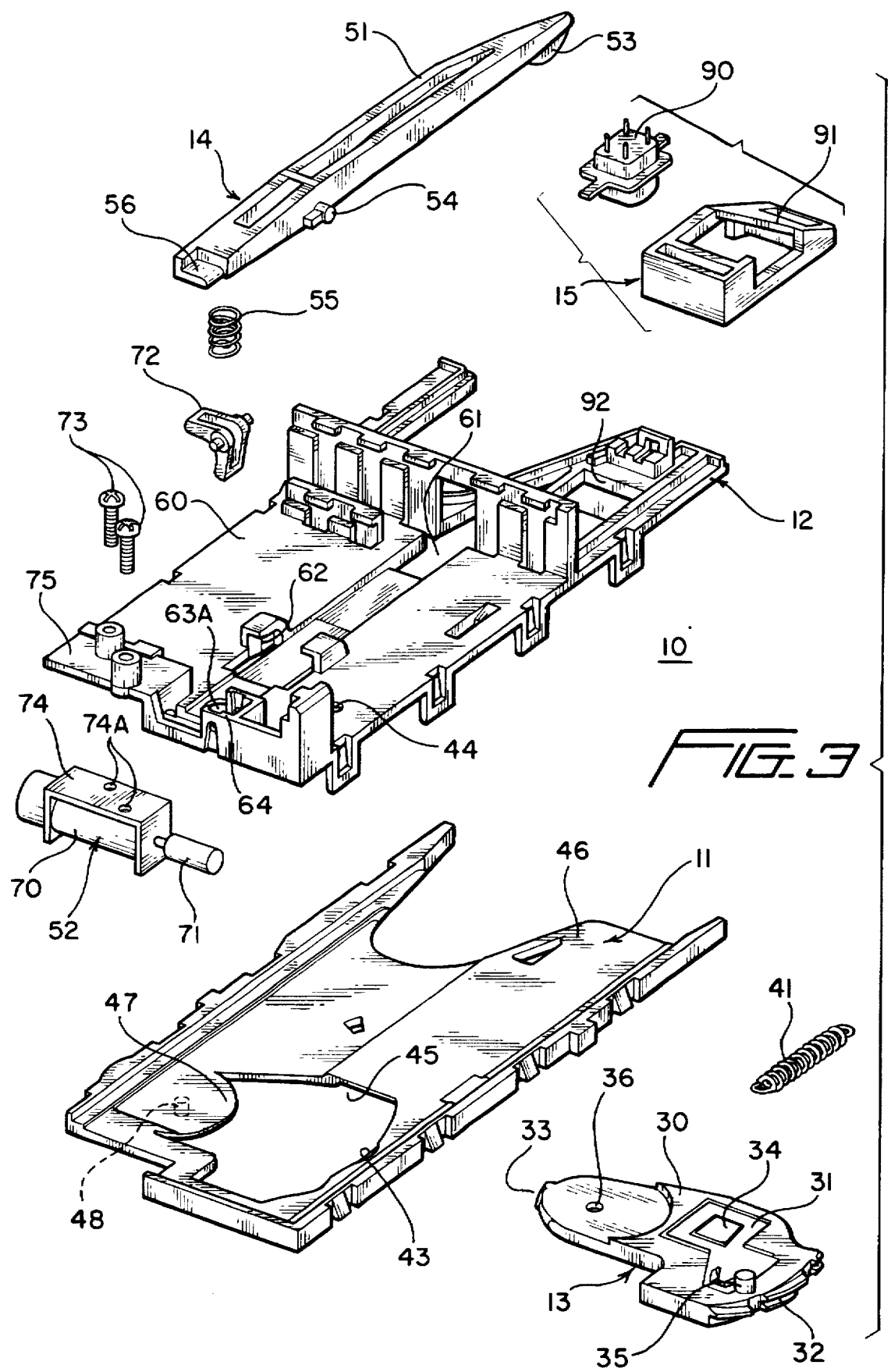
FIG. 3 is an exploded assembly view of a reader/writer apparatus in accordance with this invention.

Referring now to FIGS. 1–3 the main components of a reader/writer apparatus of this invention will be described. Reader/writer apparatus 10 for a contact-type smart card includes a frame 18 forming a card slot 19 for receiving a smart card 20 shown in dashed lines in FIG. 1 in a partially inserted position. As will be discussed below reader/writer apparatus 10 may also include a mag-stripe card reader assembly 15. Reader/writer apparatus 10 can then operate with either contact type smart cards or mag-stripe data cards or cards which combine the features of a smart card and a mag-stripe card.

FIG. 1A illustrates a smart card 20 with a contact pad set 21 thereon for making electrical connections to an integrated circuit which is encapsulated in the plastic of the card body, usually directly under contact pad set 21. Mag-stripe cards have data recorded in magnetic domains on a stripe of magnetizable material 22. The details of the structure and function of both a smart card and a mag-stripe card are well known and will not be discussed here.

As shown in the drawing figures, frame 18 comprises a upper frame member 11 and a lower frame member 12. [The terms "upper" and "lower" are used for convenience in distinguishing the two elements of the mechanism. They are not intended to limit the possible orientations in which the reader/writer mechanism of this invention might be employed, e.g. in a vertical position as well as a horizontal position as generally shown in the drawings.]

A landing contact mechanism 13 is carried on frame 18, or more specifically on upper frame member 11, for making electrical contact with contact pads 21 on smart card 20 when fully inserted in card slot 19. Landing contact mechanism 13 includes connector carriage 30 and a connector block 31 mounted in a recessed portion thereof. Connector block 31 includes a card contact set 34 (illustrated in detail in FIGS. 9A and 9B) for making actual electrical contact with contact pads 21 on smart card 20. Details of how this connection is made will be discussed below.

It should be understood that connector carriage 30 and connector block 31 could alternatively be fashioned as an integral assembly, i.e. with card contact set 34 and other elements of connector block 31 directly formed on connector carriage 30.

Figure 6:
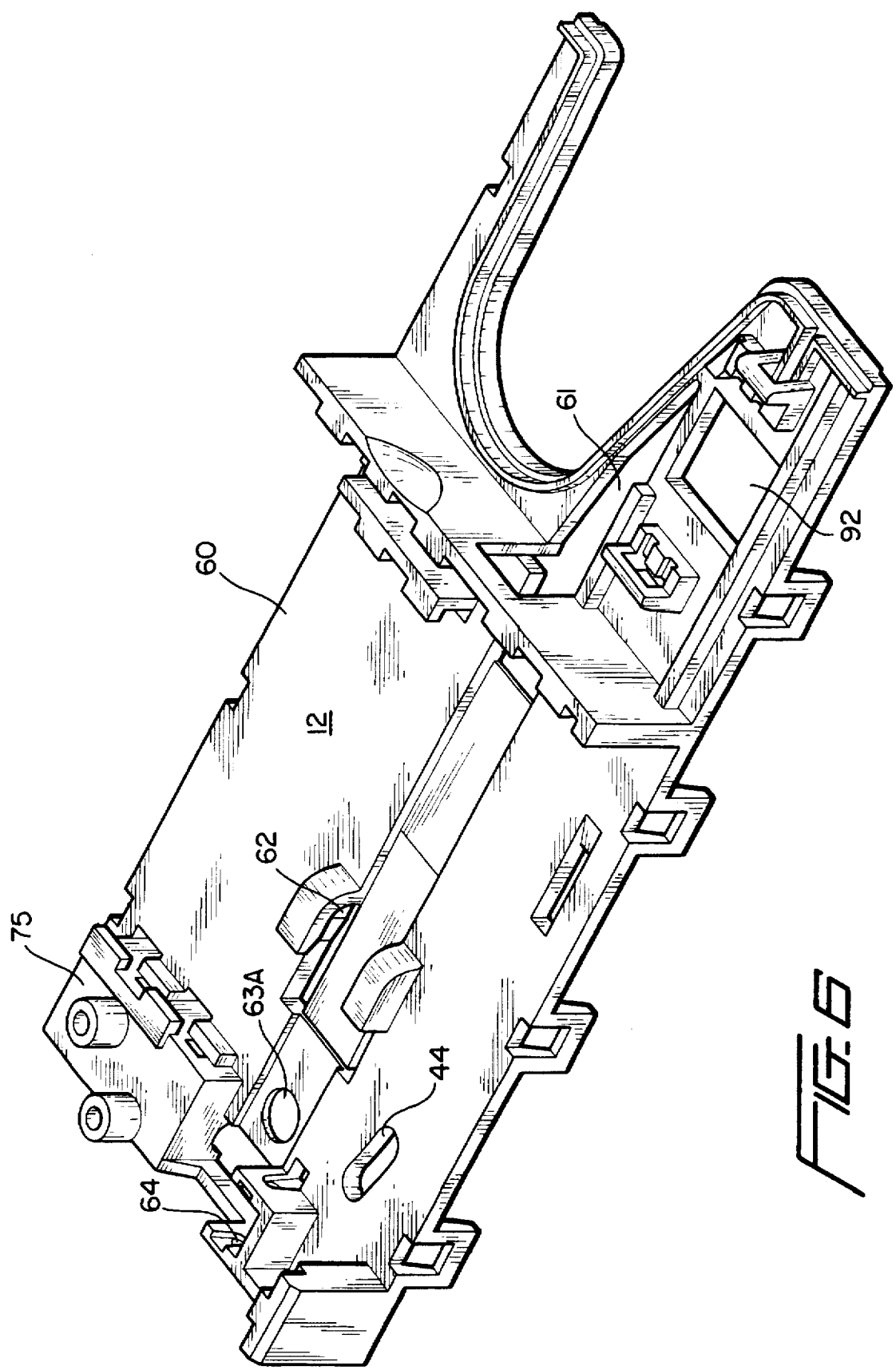

Connector carriage 13 is mounted to frame 18 on a pivot axis 40 so that connector carriage 13 is free to rotate generally in a plane parallel to card slot 19 through a small angle. A drive means in the form of post 35 is formed on the contact side of connector 13 and contacts a leading edge of a smart card inserted in card slot 19 to rotate the connector carriage through a prearranged angle as the card moves to a predetermined read position within card slot 19. The initial and final angular positions of connector carriage 30 and thus the predetermined angle of rotation of connector carriage 30 is controlled by guide slot 44 which is best seen in FIGS. 6 and 7. Post 35 is received in guide slot 44 so that guide slot 44 can provide this angular position control.

Screw threads 32 and 33 formed on opposite edge portions of connector carriage 30 cooperate with mating screw threads 42 and 43 on frame 18 to move connector carriage 30 a predetermined distance into card slot 19 as connector carriage 30 rotates through the prearranged angle. This inward movement of connector carriage 30 brings connector carriage 30 to a card read position in which the card contact set 34 is in good electrical contact with contacts 21 on smart card 20 when inserted to the card read position.

The overall operation thus involves drive post 35 on connector carriage 30 being contacted by the leading edge of smart card 20 as it nears the card read position. Smart card 20 and connector carriage 30 then move together as smart card 20 is pushed further into card slot 19 with connector carriage 30 rotating and moving toward smart card 20 to land the card contact set 34 onto the contact pads 21 of smart card 20. The magnitude of inward movement of connector carriage 30 is designed to produce an adequate wiping action of the spring loaded contacts of card contact set 34 as the contacts land on the individual one of the contact pads 21 of smart card 20 and the tolerances of this action are well known and need not be discussed here.

In an actual commercial version of this embodiment of the invention, connector carriage 30 rotates through an angle of ten degrees and the cooperating screw threads are designed to produce an inward movement of connector carriage 30 of one millimeter.

Tension spring 41 is coupled between connector carriage 30 and frame 18 to bias connector carriage 30 toward an initial rest position in which post 35 is in contact with the forwardmost wall of guide slot 44. A card latch arrangement 14 including latch arm 51 and solenoid latch release mechanism 52 is mounted on frame 18 and operates when the smart card 20 is inserted to the read position such that latch arm 51 latches smart card 20 in the card read position and thereby latches connector carriage 30 in its read position. Solenoid latch release mechanism 52 operates to release latch arm 51 and this permits tension spring 41 to return connector carriage 30 from its read position to its initial rest position. As connector carriage 30 moves back to its rest position, post 35 drives inserted smart card 20 partially out of card slot 19.

Details of mounting of connector carriage 30 on frame 18 will now be discussed. Frame 18 has an open region 45 in upper frame wall 46, which wall forms a portion of card slot 19. Open region 45 admits connector carriage 30 and connector block 31 into card slot 19 so that connector block 31 can make contact with an inserted smart card 20. A mounting flange 47 and a mounting post 48 are formed on one side of open region 45 for defining the pivot axis of connector carriage 30. Aperture 36 on connector carriage 30 receives mounting post 48. Screw thread portions 42 and 43 are formed on interior edge portions of open region 45 as shown. Screw threads 32 on connector carriage 30 engage screw threads 43 on upper frame wall 46. Screw threads 33 engage screw threads 42 on upper frame wall 46.

Frame 18 and specifically upper frame wall 46 has a recessed area 49 adjacent to and communicating with open region 45 and a spring mounting post 49A. Connector carriage 30 has a spring mounting aperture 37 means formed thereon. Tension spring 41 connects on one end to spring mounting post 49A and on the other end to spring mounting aperture 37. As previously discussed, tension spring 41 biases connector carriage 30 toward its initial or rest position and returns it to that position when solenoid latch release mechanism 52 operates to put latch arm 51 in its card release position.

Details of card latch 14 will now be discussed. Elongated latch arm 51 is pivotally mounted on lower frame wall 60 via a mounting post 54 received in mounting bracket 62 on lower frame wall 60. A latch head element 53 is formed one end of latch arm 51 and latch head element 53 extends into card slot 19 through an open region 61 formed in lower frame wall 60. Elongated latch arm 51 pivots between a card admit/release position shown in FIG. 12 and a card latch position shown in FIG. 12. A card latch compression spring 55 is mounted between frame 18, specifically upper frame wall 46, and latch arm 51 as shown in FIG. 11. Card latch compression spring 55 is captured in recesses 63A and 63B in upper frame wall 46 and latch arm 51 as shown.

Latch head element 53 has a sloped surface 53A facing toward the card entry portion of card slot 19 and this sloped surface permits the leading edge of an inserted card to move latch head element 53 to the card admit position. The rounded bottom portion of latch head element 53 rides up on the surface of smart card 20 as shown in FIG. 12 until the trailing edge of smart card 20 card passes latch head element 53. This happens as smart card 20 reaches the card read position within card slot 19. Card latch compression spring 55 then pivots latch arm 51 to return latch head element 53 to the card latch position as shown in FIG. 13. In this relative positioning of smart card 20 and latch head element 53, smart card 20 is precluded from being manually removed from card slot 19 by card latch surface 53B which faces away from the card entry portion of card slot 19. As shown in FIG. 13, a lower portion of latch head element 53 extends into a open region 101 in upper frame wall 46 to ensure that smart card 20 is securely latched in the card read position. The card latch position of latch arm 51 maintains smart card 20 in the read position and the latched card maintains connector carriage 30 in the read position by resisting the return action of tension spring 41.

In an overall system such as a transaction terminal, the reader/writer mechanism of this invention would be integrated into a housing that would block access of a cardholder from the opening 101 in lower frame wall 60 of lower frame member 12. In other words, the cardholder would not be able to reach under and use a finger to unlatch the card reader/writer.

Solenoid latch release mechanism 52 includes a solenoid 70 with an extended core piece 71 as shown best in FIG. 14. Solenoid 70 is carried in a bracket 74 which is mounted to lower frame wall 60 at mounting structure 75 using a pair of screws 73. A latch release lever 72 of generally L-shape is mounted in pivotal manner in a release lever bracket 64 formed on lower frame wall 60. One leg of latch release lever 72 is operatively associated with the end of core piece 71 of solenoid 70 and the other with a latch arm release point 56 of latch arm 51. FIG. 14 shows latch arm release point 56 in a position relating to the card admit position of latch arm 51 when a smart card 20 is being inserted in the reader/writer mechanism. When latch arm 51 is in a card latch position, the upper surface of latch arm release point 56 is in contact with the upper leg of latch release lever 72 and is held there by the pressure of compression spring 55.

When solenoid 70 is operated latch release lever 72 pivots and forces latch arm release point 56 down and thus pivots latch arm 51 to its card accept position and holds it there while solenoid 70 is operated. Solenoid 70 need only be operated momentarily since, as soon as latch arm 51 is in the card accept/release position, tension spring 41 associated with connector carriage 30 will return connector carriage 30 to its initial position which will, in turn, drive smart card 20 partially out of card slot 19. Once smart card 20 is pushed away from the card read position, latch arm 51 is riding on top of smart card 20 and latch arm 51 remains in the card accept/release position until smart card 20 is manually withdrawn from card slot 19.

It should be apparent that other latch release mechanisms could be employed in the reader/writer mechanism of this invention. For example, a manual latch release arrangement could readily be substituted for the solenoid operated release mechanism by providing a release button that extends outside the case of the device. For customer satisfaction, it may be important to have a backup manual release button available to ensure that a cardholders card may be released from the reader/writer apparatus 10 even should the electronics of the system fail in some fashion that prevents the solenoid 70 from being operated. A manual release button could be hidden inside a door of the housing in which the reader/writer apparatus 10 is mounted. Alternatively, a small hole could be included in the housing through which the end of a paper clip could be inserted to push a latch release button.

The smart card reader/writer mechanism of this invention may also be adapted to read mag-stripe cards using a mag-stripe reader mechanism 15 comprising a read head 90 and a read head mounting bracket 91. Read head 90 has a front data pick up face which extends through an opening 92 in lower frame wall 60 into card slot 19 so as to contact a mag-stripe region of a card inserted into card slot 19.

Figure 4:
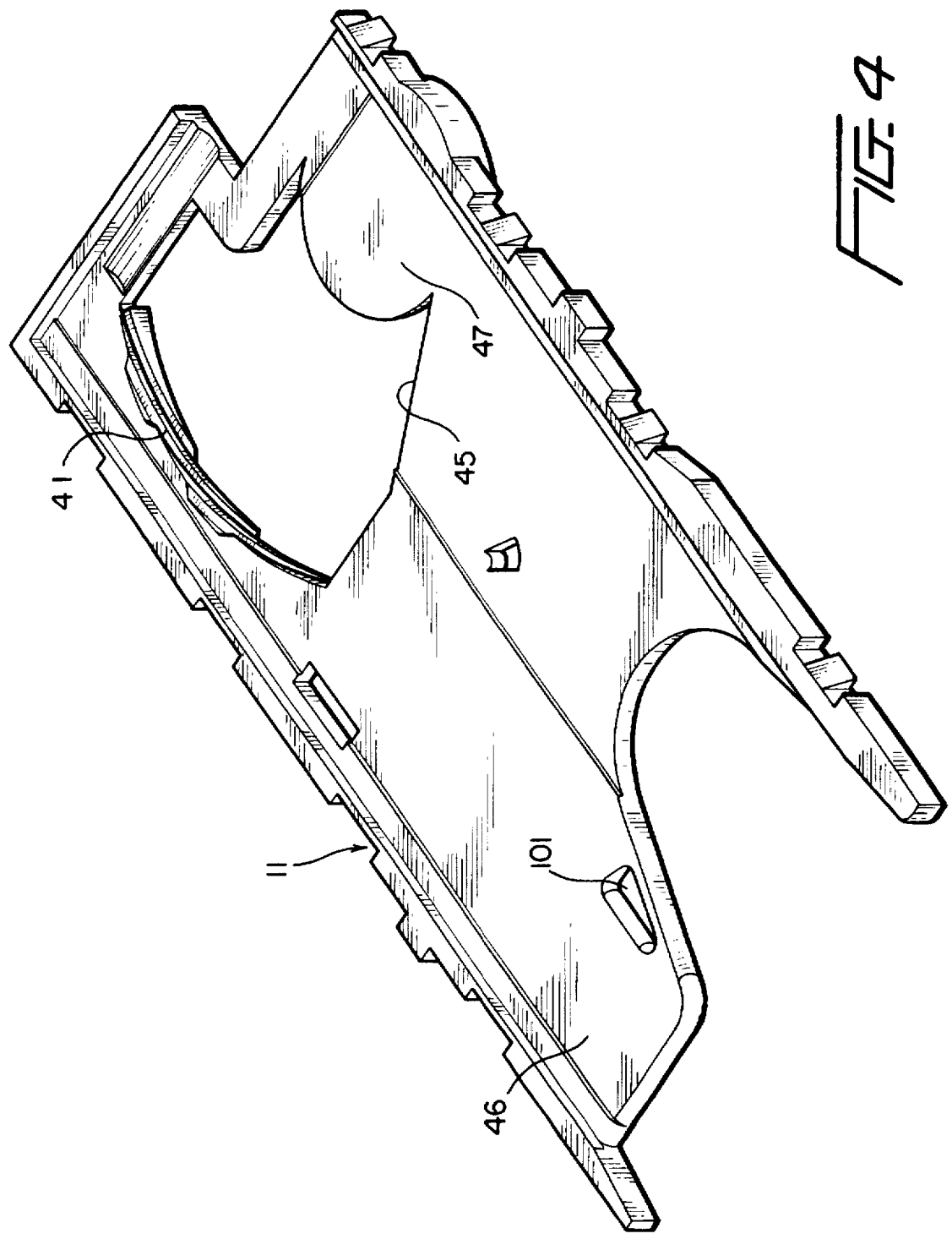
Figure 5:
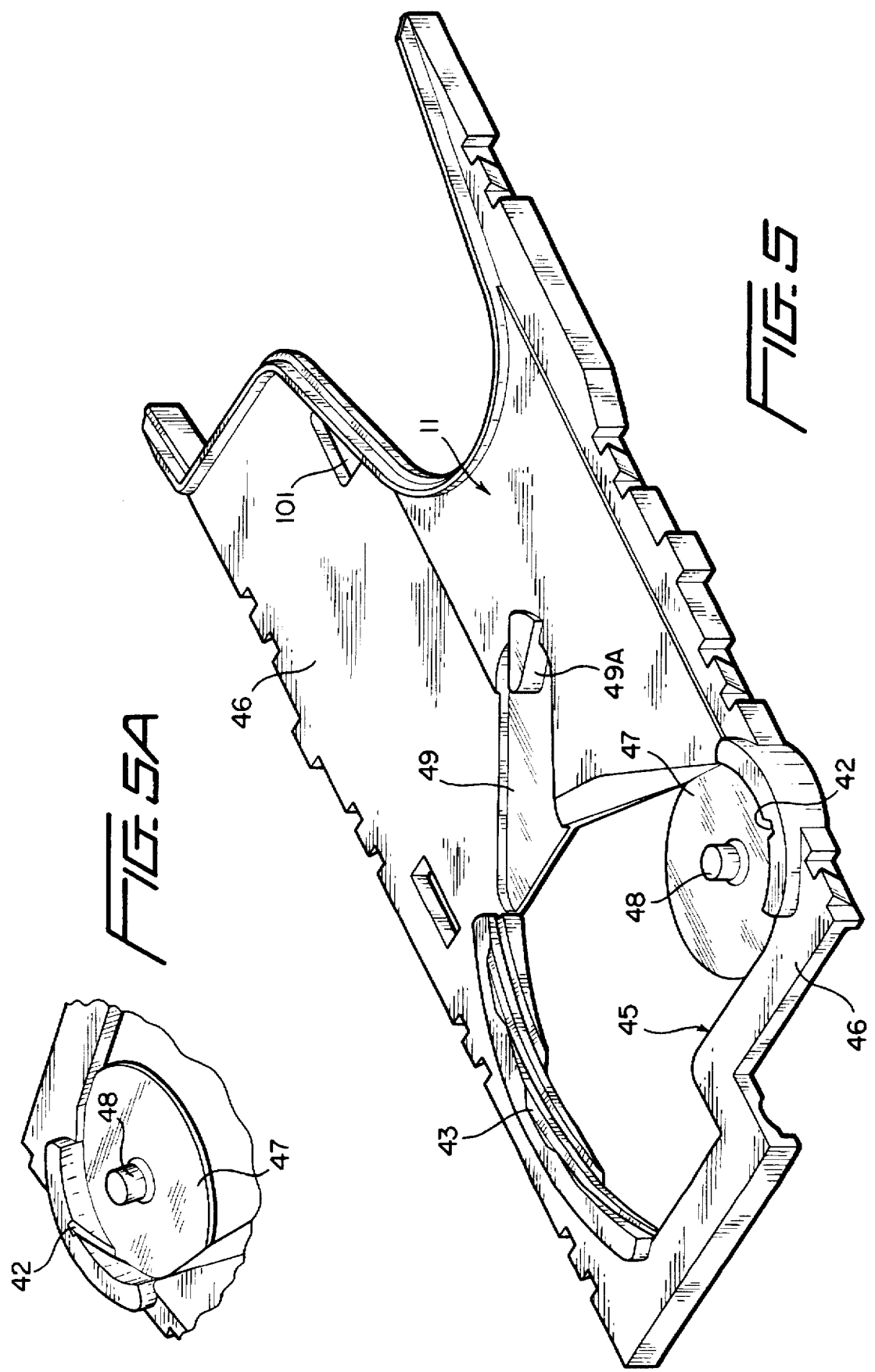

FIGS. 4, 5 and 5A are different views of upper frame member 11 showing the details of its structure. FIGS. 6 and 7 are different views of lower frame member 12 illustrating details of its structure. As shown, upper frame wall 46 and lower frame wall 60 are adapted to snap together to form frame 18. This snap together assembly arrangement is a preferred one from an ease of assembly standpoint, but of course alternative assembly arrangements could be employed. Upper frame member 11 includes wall structures forming the side walls of card slot 19. In this manner, upper frame member 11 controls the positioning of an inserted smart card 20 relative to the connector carriage 30 and connector block 31 and contacts thereon for making reliable connections to smart card 20.

FIGS. 8A–8D together with FIGS. 9A, 9B, and 10, illustrate details of connector carriage 30 and connector block 31 and how connector block 31 mounts on connector carriage 30. Connector carriage 30 has a recessed area 110 that is sized and shaped to receive connector block 31. An arrangement of slots 111 in recessed area 110 accommodate connector leads 112 on connector block 31 as connector block 31 is inserted in recessed area 110.

An arrangement of five small apertures 113 are formed in a bottom wall portion of recessed area 110 to receive five mounting posts 114 on connector block 31. Connector block 31 includes a card-in switch arrangement 115 which detects when the leading edge of smart card 20 is in position contacting drive post 35 on connector carriage 30. Card-in switch 115 closes a short time before the smart card 20 and connector carriage 30 travel the final short distance to the final contact position of connector carriage 30 and connector block 31 with contacts 116 of connector block 31 landed on contact pads on smart card 20. This short time delay is taken into account in the electronics portion (i.e. in either hardware or software) of an overall smart card reader/writer apparatus in which reader/writer mechanism 10 is employed.

It should be understood that other forms of card-in sensor could be employed. For example, drive post 35 could operate a separate microswitch mounted in a position to be closed when connector carriage 30 is driven to its final read position by the leading edge of smart card 20. Alternatively, another switch (not shown) could be mounted in association with elongated latch arm 51 to indicate when it is in the card latched position. The reader/writer software would then know that a smart card 20 is fully inserted to the read position when both switches are closed. This latter arrangement would prevent the reader/writer from trying to read a smart card 20 which is only inserted far enough to activate the card-in switch 115, but not to bring smart card 20 to the fully inserted read position.

Reader/writer apparatus 10 is designed for ease of assembly as well as simplicity, low-cost and reliability. Referring to exploded assembly drawing of FIG. 3, supplemented by the other drawing figures, assembly operations of reader/writer mechanism 10 involve the following steps:

Lower frame member 12 and components carried thereon are assembled in this manner:

Compression spring 55 is placed into recessed area 63A. Latch head element 53 of elongated latch arm 51 is placed in opening 61 with pin 54 in position to slide into rocker bracket 62. Compression spring 55 is compressed by pushing down on the back portion of elongated latch arm 51 and then elongated latch arm 51 is moved forward to position pins 54 in rocker bracket 62.

If the mag-stripe reader portion is to be included in the apparatus, mag-head 90 is placed in aperture 92 in lower frame member 12. The mounting arrangement provides for two different mounting positions for different two-track reading specifications. Mounting frame 91 is than snapped onto lower frame member 12 to capture the mag-head in position.

Latch release lever 72 is placed in mounting bracket 64 of lower frame member 12, preferably using a needle nose pliers to compress the sides of lever 72 until it is inserted, and thereafter releasing the sides so that pins thereon are captured in the bracket. Alternatively, this step can be done by hand if a person's fingers are strong enough to provide the compression force. Solenoid assembly 52 is placed into its mounting bracket 75 and two screws 73 are driven into threaded apertures 74A to hold solenoid 70 in position.

Upper frame member 11 and components carried thereon are assembled in this manner:

Connector block 31 is mounted in recessed portion 110 of connector carriage 30. Then connector carriage 30 is mounted onto upper frame member 11 by placing aperture 36 in position to receive mounting post 48 and then rotating the unit to gradually engage the cooperating screw threads 32,43 and 33,42. A needle nose pliers is preferable used to attach the ends of tension spring 41 to aperture 37 on connector carriage 30 and to mounting pin 49A on upper frame member 11. This latter step can also be done by hand manipulation of tension spring 41.

With both lower frame member 12 and its components assembled and upper frame member 11 and its components assembled, the two frame members are snapped together using the resilient hook and catch arrangements thereon.

Thereafter, a flex cable (not shown) is soldered to the pins 112 on connector block 31 and also to the pins on mag-head 90, if included in the reader/writer mechanism 10.

FIGS. 15 and 16 illustrate schematically an alternative form of card latch mechanism. In this mechanism, a latch arm 151 is mounted for pivoting about the point 162 and has a latch head element 153 on one end and a card actuating ramp 154 on the other end. A bistable spring element 155 holds latch head element 153 in the card accept position as smart card 20 is being inserted in card slot 119. When the leading edge of smart card 20 hits ramp 154, latch arm 151 pivots upon further inward movement of smart card 20 and latch head element 153 moves into position to block card removal from card slot 119. At some point in this process of pivoting latch arm 151, bistable spring 155 is actuated to its alternative stable state which maintains latch head 153 in the latched position.

After this latching is completed and the smart card 20 is released by the cardholder, landing contact mechanism 13 pushes smart card 20 back a short distance to rest against latch head 153 which is arranged to be the final read position of smart card 20. This positions leading edge 20A of smart card 20 away from actuating ramp 154 so that bistable spring 155 can be driven back to the unlatched state after card reading and writing operations are completed. To unlock the card latch, solenoid 152 is actuated to move bistable spring 155 back to the unlatched state. This pivots elongated latch arm 151 to the card accept position and allows the return spring on landing contact mechanism 13 to drive smart card 20 partially out of card slot 119.

The above description of alternative embodiments of this invention is given by way of example only. Persons of skill in this art could readily make numerous changes and adaptations without departing from the invention as claimed in the following claims.

What is claimed is:

1. In a reader/writer apparatus for a contact-type smart card and having a frame forming a card slot for receiving a smart card, a landing contact mechanism carried on said frame for making electrical contact with contact pads on said smart card when inserted in said card slot and comprising:

a connector carriage carrying a card contact set thereon facing said card slot;

means mounting said connector carriage to said frame on a pivot axis defined thereon such that said connector carriage rotates generally in a plane parallel to said card slot, drive means formed on said connector carriage and arranged to contact a leading edge of a smart card inserted in said card slot to rotate said connector carriage through a prearranged angle as said card moves to a predetermined read position within said card slot, cooperative screw thread means being formed on said connector carriage and said frame for moving said connector carriage a predetermined distance into said card slot as the connector carriage rotates through said prearranged angle to thereby bring said connector carriage to a read position with said card contact set in contact with said smart card.

2. Apparatus as claimed in claim 1, wherein said drive means comprises a post formed on said connector carriage and extending into said card slot to contact a leading edge of a card inserted into said card slot such that said card directly drives said connector carriage from an initial position to said read position during a final insertion movement of said card to a read position within said card slot.

3. Apparatus as claimed in claim 1, wherein said frame defines an open region in one wall thereof forming a portion of said card slot for admitting said connector carriage and connector block thereon into said card slot, said frame having a mounting flange and post formed on one side of said open region for defining said pivot axis of said connector carriage, said frame further having a screw thread means formed on interior edge portions of said open region, said connector carriage including an aperture mounted over said post to pivot thereon and having screw thread means formed on side wall portions adjacent to and engaging with said screw thread means on said interior edge wall of said open region and together forming said cooperative screw thread means.

4. A reader/writer apparatus for a smart card having a set of contact pads formed thereon at a prearranged location, said reader/writer apparatus comprising:

frame means forming upper, lower, and side wall structures of a card slot for receiving a smart card; and a landing contact mechanism carried on said frame means for making electrical contact with said set of contact pads on said smart card when inserted in said card slot;

said landing contact mechanism comprising a connector carriage;

a connector frame including a card contact set mounted on said connector carriage with contacts facing said card slot, means mounting said connector carriage to a prearranged one of said upper and lower wall structures at a pivot axis defined thereon such that said connector carriage rotates generally in a plane parallel to said prearranged wall structure;

drive means formed on said connector carriage to enable a card inserted in said card slot to rotate said connector carriage through a prearranged angle as said card moves to a read position within said card slot, cooperative screw thread means being formed on said connector carriage and said one of said upper and lower wall structures for moving said connector carriage a predetermined distance into said card slot as the connector carriage rotates through said prearranged angle to thereby bring said connector carriage to a read position with said card contact set in contact with said inserted card at said prearranged location corresponding to contact pads on a smart card.

5. Apparatus as claimed in claim 4, wherein said drive means comprises a post formed on said connector carriage and extending into said card slot to contact a leading edge of a card inserted into said card slot such that said card directly drives said connector carriage from an initial rest position to said read position during a final insertion movement of said card to a read position within said card slot.

6. Apparatus as claimed in claim 4, wherein said prearranged wall structure defines an open region for admitting said connector frame to said card slot and having a mounting flange and post formed on one side of said open region for defining said pivot axis of said connector carriage, and screw thread means formed on an opposite interior edge wall portions of said open region, said connector carriage being mounted over said post to pivot thereon and having screw thread means formed on side wall portions adjacent to and engaging said screw thread means on said interior edge wall portions of said open region.

* * * * *